Feb. 2, 1960   R. W. HOEPPEL ET AL   2,923,250
MEASURING DEVICE
Original Filed Feb. 17, 1956   6 Sheets-Sheet 4
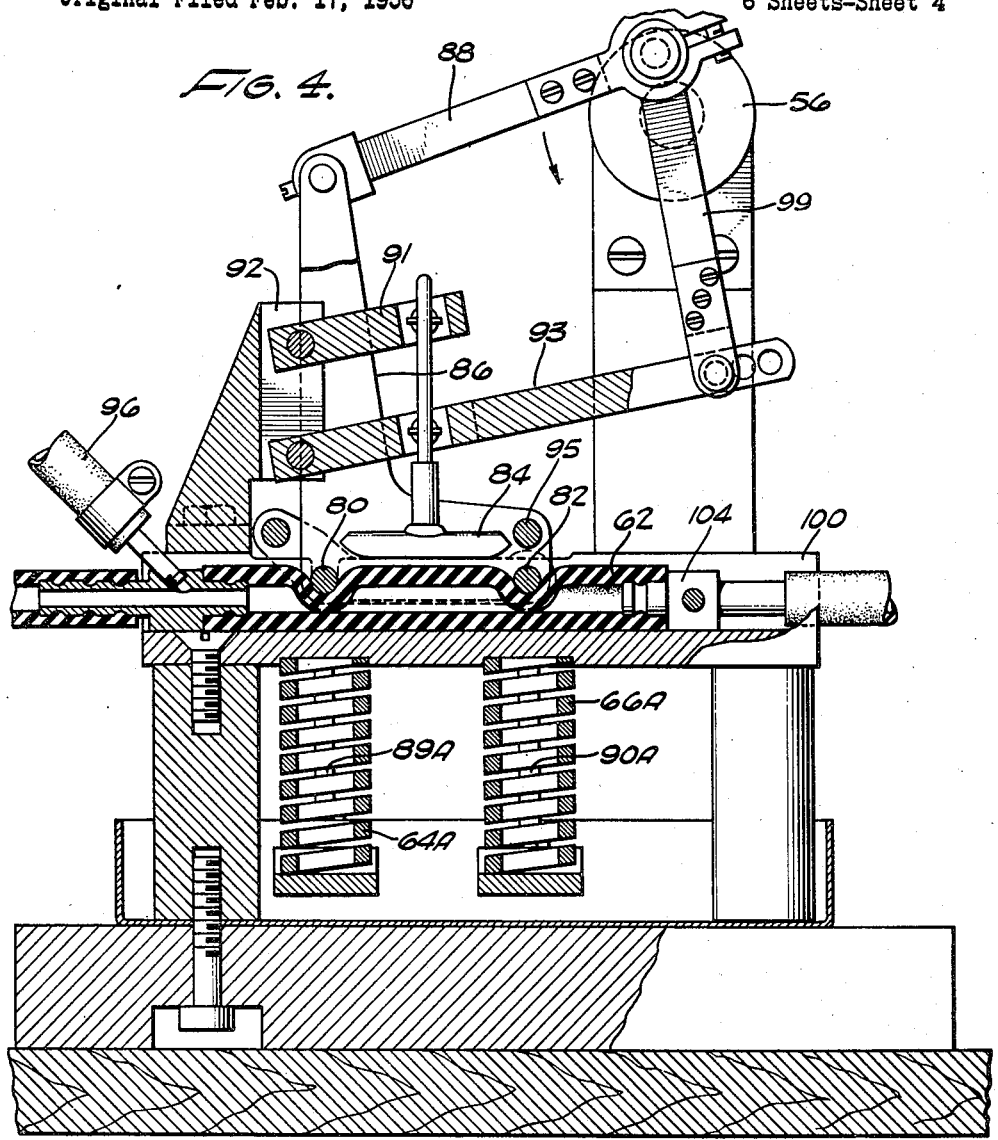
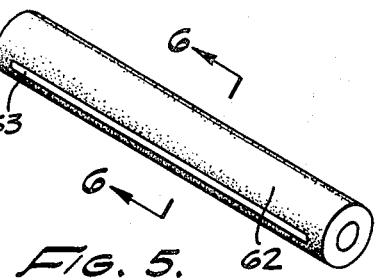
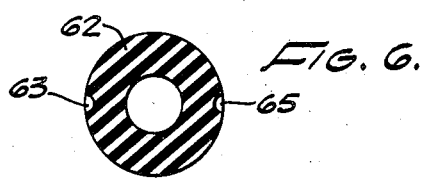
INVENTORS
RAYMOND W. HOEPPEL
WALTER G. THIELE
BY
ATTORNEYS Feb. 2, 1960 R. W. HOEPPEL ET AL 2,923,250
MEASURING DEVICE
Original Filed Feb. 17, 1956 6 Sheets-Sheet 5
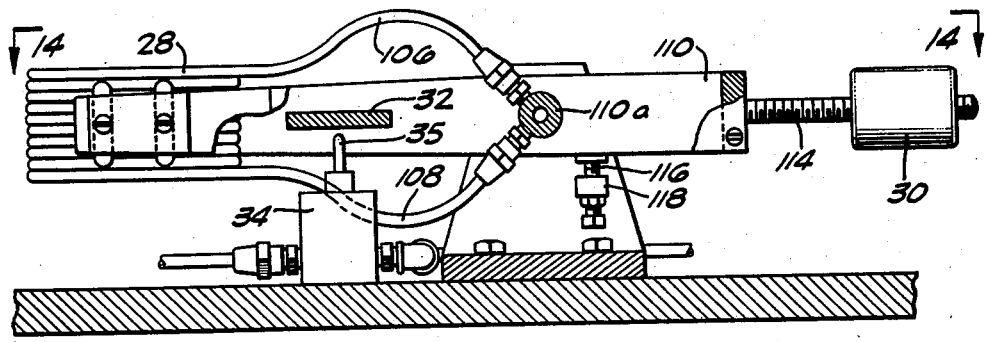
FIG. 13.
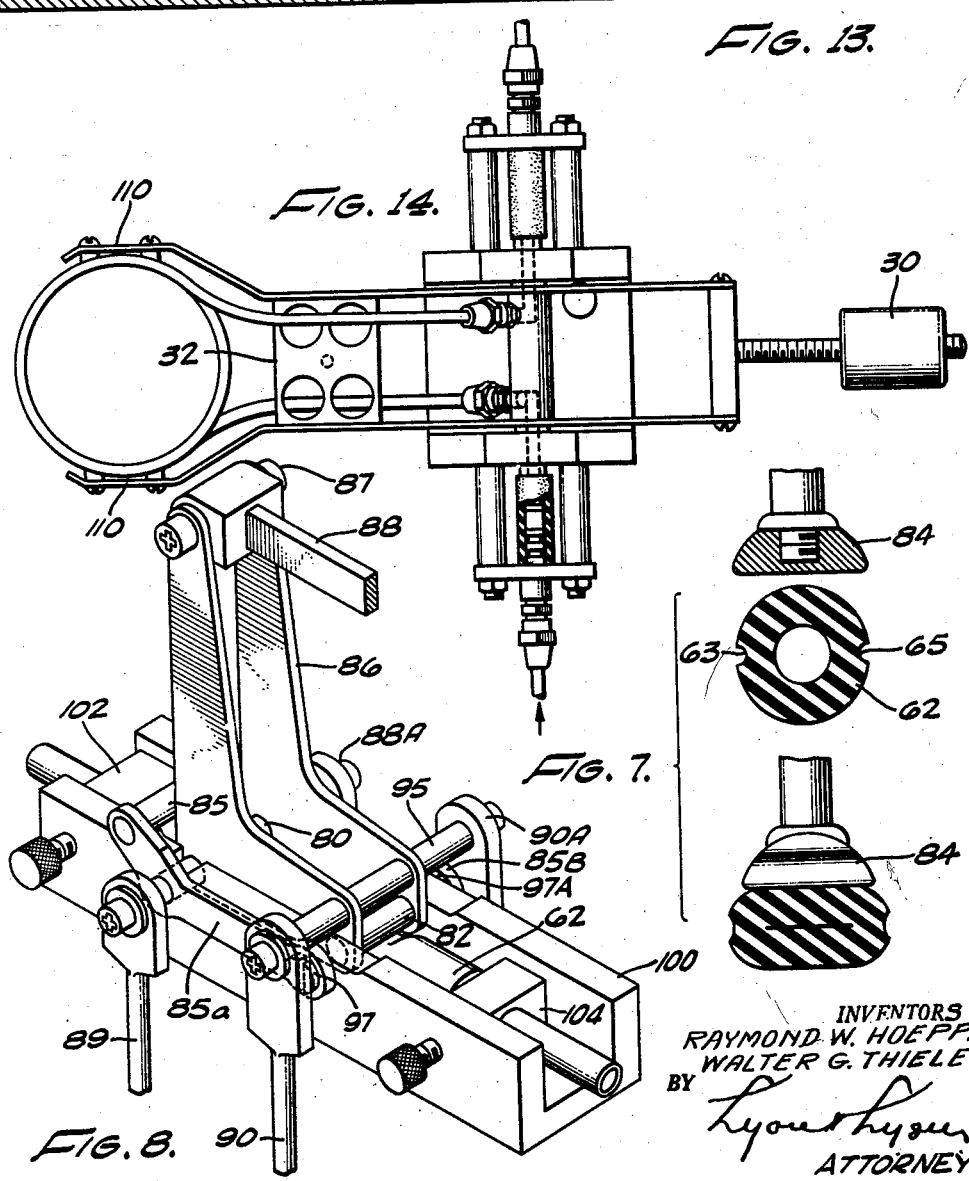
INVENTORS
RAYMOND W. HOEPPEL,
WALTER G. THIELE
BY
ATTORNEYS

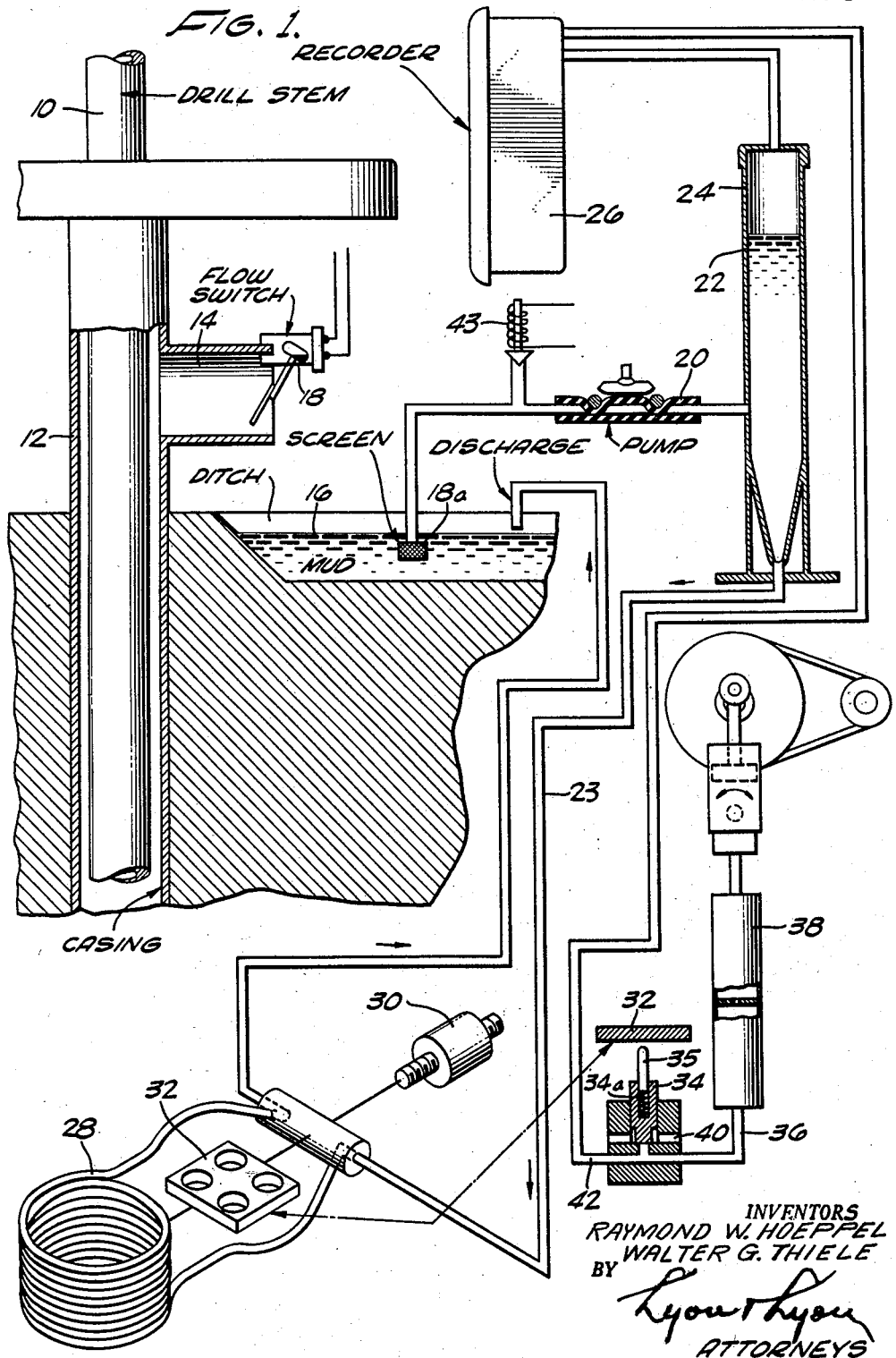

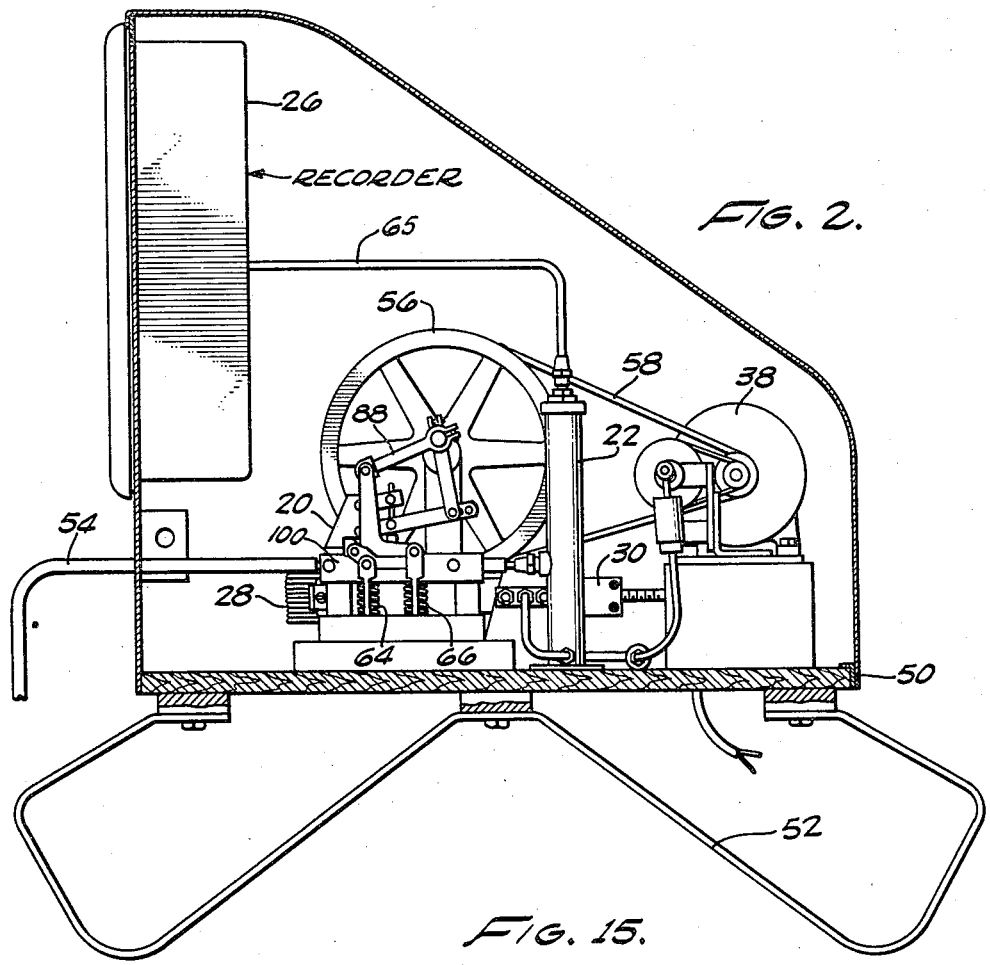
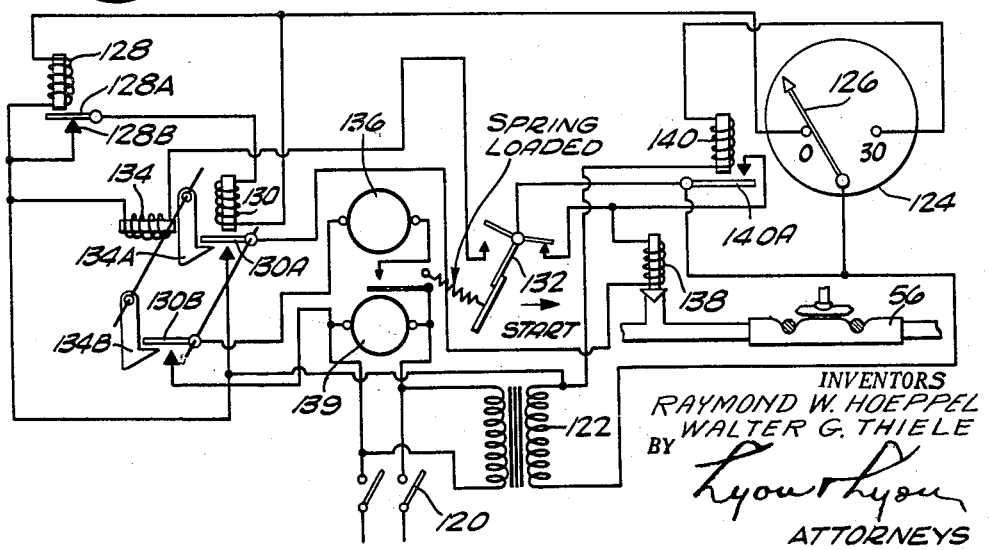

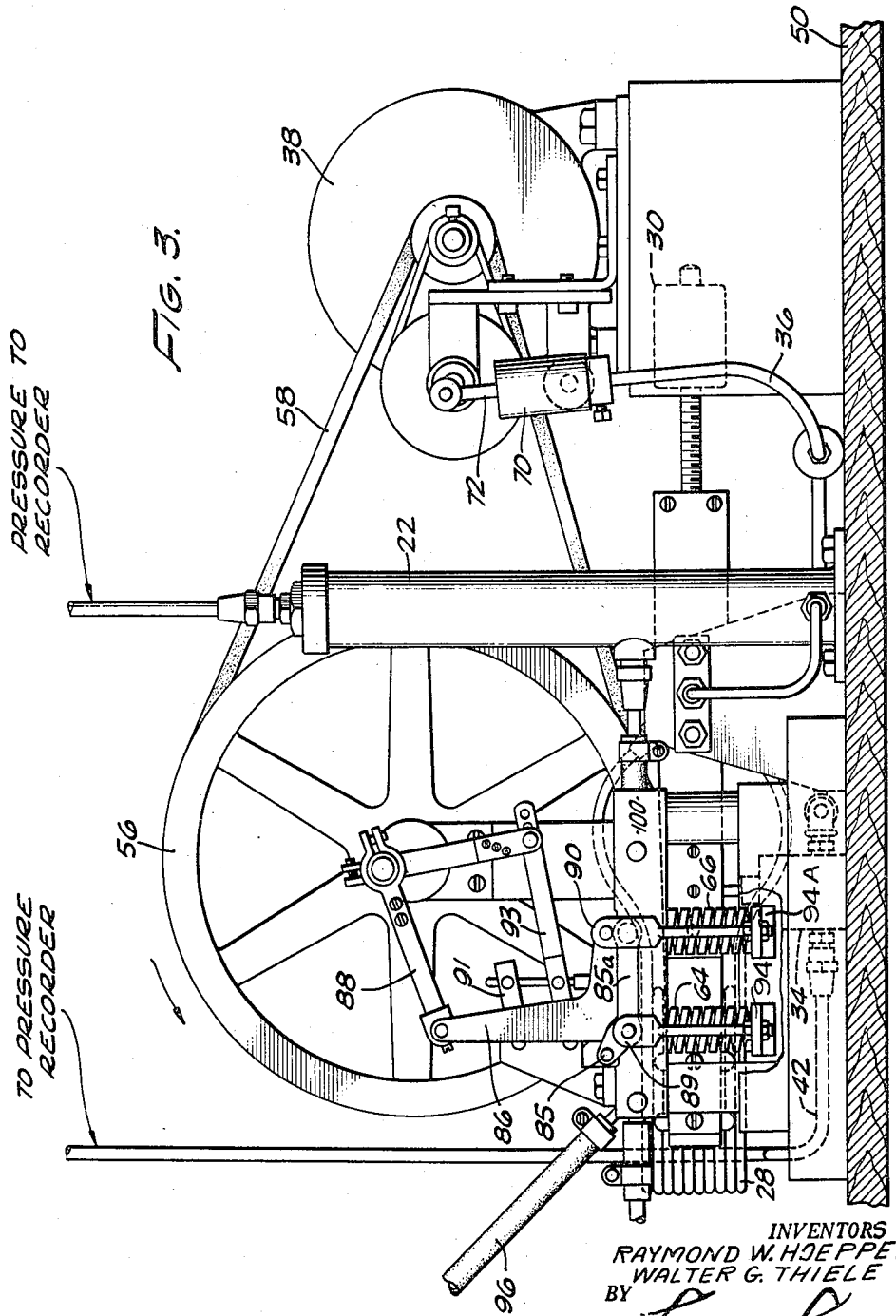

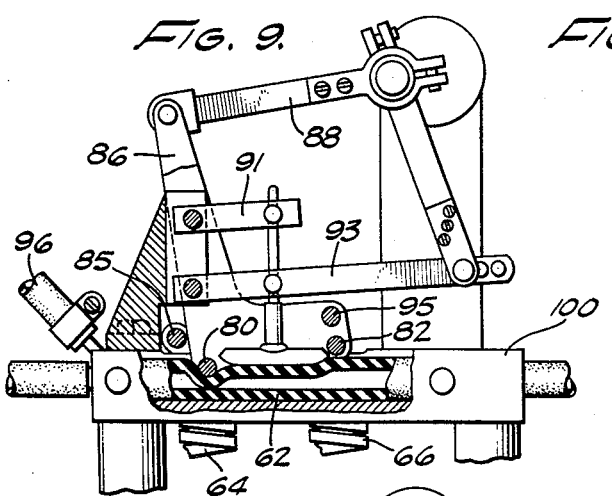
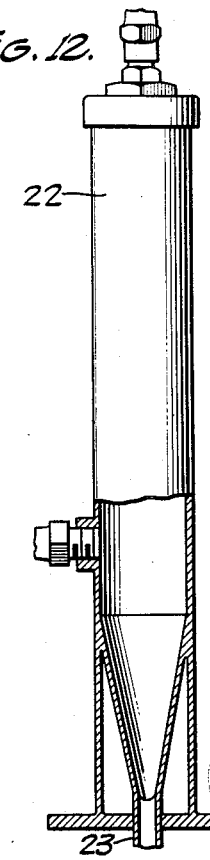
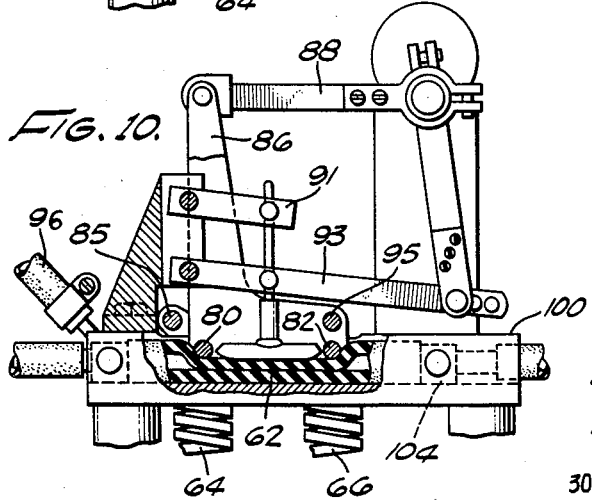
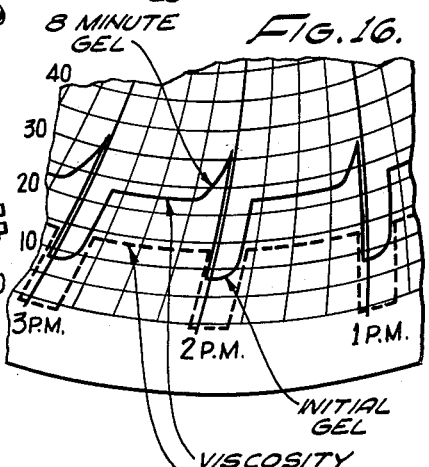
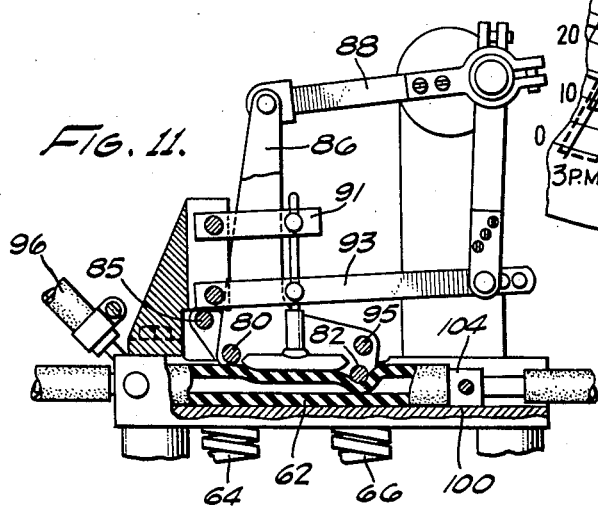

United States Patent Office 2,923,250
Patented Feb. 2, 1960

2,923,250

MEASURING DEVICE

Raymond W. Hoeppel, La Habra Heights, and Walter G. Thiele, Alhambra, Calif.

Original application February 17, 1956, Serial No. 566,134. Divided and this application June 3, 1957, Serial No. 663,223

4 Claims. (Cl. 103—148)

This invention relates to a device for determining the properties of fluids which are used in oil-well drilling and, more particularly, to improvements in determining the viscosities, specific gravity, and gel strength continuously of thixotropic fluids.

This application is a division of application by these inventors, Serial No. 566,134, filed February 17, 1956, for a Measuring Device.

In the drilling of wells, such as oil wells, it is advantageous to know at all times the characteristics of the mud emerging from the well bore, so that the various conditions which develop as the bit passes through different formations may be known and met by controlling the characteristics of the mud introduced into the well bore. From a knowledge of the characteristics of the mud as it is returned to the well bore, disastrous results may be avoided by adding constituents to the mud to suit the conditions being encountered. Although this invention is described in connection with a thixotropic fluid, such as mud, it may be employed to determine continuously the characteristics of other types of fluids or slurries.

An object of the present invention is to provide novel apparatus for continually determining the characteristics of thixotropic fluid.

Another object of the present invention is to provide reliable apparatus for continually monitoring the characteristics of oil-well drilling muds.

Still another object of the present invention is the presentation of novel, useful, and simple apparatus which may be employed for the purpose of determining the viscosity and specific gravity of fluids or slurries.

These and other objects of the invention are achieved by presenting apparatus wherein a pump is employed to pump the fluid into an air-bell chamber and thence through a coil of tubing. A transducer connected to the top of the air bell measures the air pressure therein, which is a measure of the resistance to flow of the fluid through the tubing. The air pressure is recorded as a measure of the viscosity of the fluid.

The coil of tubing is located at the end of a beam balance and is continuously weighed by means of a pneumatic-force pressure transducer located below the beam, so as to resist the gravitational force exerted on the coil of tubing by the weight of the fluid that it contains. If desired, an electrical strain-gage force transducer may be employed instead of the pneumatic transducer for purposes of measuring the force exerted on the beam by the fluid in the tubing. Stops limit the movement of the balance beam to only a few degrees of arc. It is important that the cross-sectional area of the tubing being weighed sufficiently small so as to eliminate the possibility of stagnant flow being developed in portions of the flow area because of gelation effects. Since the volume of the material being weighed is fixed, the air pressure transmitted by the transducer may be recorded as a measure of the specific gravity of the fluid. Where thixotropic fluids are being measured, further means are provided to stop the pump at given times for predetermined durations, to permit the fluid to gel. Then the pump is started again and the maximum pressure attained, in order to start the fluid moving at its normal rate of flow, is a measure of its gelation properties. In the event of any obstruction, a means is provided to introduce air into the pump so that the obstruction may then be easily cleared by air pressure and thus avoid the development of an excessive pressure such as might occur if a noncompressible fluid were pumped.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a schematic drawing of an embodiment of the invention;

Figure 2 is a side view of an embodiment of the invention;

Figure 3 is an enlarged and more detailed side view of an embodiment of the invention;

Figure 4 is a view of the novel pump employed in the embodiment of the invention;

Figure 5 is an isometric view of the novel tube used in the pump shown in Figure 3;

Figure 6 is a cross section of the tube shown in Figure 5;

Figure 7 shows the manner in which the tube is compressed during the operation of the novel pump;

Figure 8 shows an isometric view of the pump arm structure used in the novel pump embodied in the invention;

Figures 9, 10, and 11 are three successive views showing different steps in the operation of the novel pump employed herein;

Figure 12 shows a view partially in section of the air-bell chamber employed in the embodiment of the invention;

Figures 13 and 14 are views in plan and elevation of that structure of the invention by means of which the specific gravity of the fluids may be continually monitored;

Figure 15 is a circuit diagram of the electrical wiring employed in the embodiment of the invention; and Figure 16 illustrates a typical recording made of the characteristics of a fluid which is being monitored by the invention.

As previously stated, the invention finds its optimum usage with the type of thixotropic fluid which is employed in oil-well drilling. This is usually known as mud, which is required to have certain characteristics in order to present optimum results and, also, in order to enable the drilling to proceed smoothly. The mud is usually pumped in through the hollow drill stem, and, in being pumped up to the surface again from the bottom of the hole, or casement, carries with it the material which is broken through by the drill. For optimum operation, it is desirable that the mud have a certain viscosity range and gelation properties, as well as specific gravity. From these characteristics, the operator may determine if a gas cutting, chemical thinning or thickening, or dilution by water is occurring. Thereby, disastrous results may be avoided by adding constituents to the mud to suit the different conditions being encountered.

Accordingly, referring now to Figure 1, which shows a general flow arrangement of the invention, there may be seen a drill stem 10 and a casing 12 for a well, the casing defining the periphery of the opening made by the drill. Mud and the debris from drilling is pumped up the casing and through the flow line 14 into a ditch 16, where the mud is held prior to being sent down into the casing again. In the flow line 14, through which the mud is discharged into the ditch, there is a switch 18, the purpose of which is to enable the starting, when desired, of the apparatus which is the embodiment of this invention, whenever mud is being discharged from the flow line and to stop the apparatus upon cessation of mud flow through the flow line.

Upon the start of mud flow through the flow line, a tube pump 20 is actuated to pick up mud from the flow line or ditch and circulate it in streamline flow at a constant flow rate into an air-bell chamber 22 and thence through a coil of tubing 28, and, finally, the mud is discharged at atmospheric pressure to the field mud tank or ditch. To pass the mud at a constant rate through the air bell and coil of tubing, a certain pressure is required which is directly related to the apparent viscosity of the mud. This presure, as measured at the top of the air bell, may be recorded as the relative viscosity of the mud, or indicated as such by a pressure gage.

While flowing through the coiled tubing, the mud is being constantly weighed by means of a beam-balance arrangement. This comprises the tubular coil 28, which receives the flow of liquid from the air-bell chamber 22. The tubular coil is counterbalanced by a weight 30. Such balancing occurs when the coil is filled with the calibrating fluid, or the lightest fluid to be measured, and it is then made to assume what can be termed a balanced position. When the coil contains a fluid heavier than the calibrating fluid, it will move downward from the position of balance. In doing this, it will depress a plate 32, which is attached to the beam and which actuates a valve mechanism 34. The valve mechanism controls the amount of air which can flow from a pump 38 through a tube 36 and through orifice 40. The plate 32 presses down upon the valve mechanism, which is biased upward by the air pressure. In the absence of any downward force on the plate 32, the air pressure pushes the valve open so that air can escape through the orifice 40. However, when a fluid heavier than the calibrating fluid passes through the coil, it presses down on the plate 32, which, in turn, presses down on the valve 34 and partially closes off the orifice 40. As the orifice 40 is closed off gradually, the amount of air which can flow through the passage 42 increases until the pressure developed therein is sufficient to counteract the gravitational force exerted by the fluid in tube 28, as transmitted via plate 32. The orifice 42 leads through a tube to the recorder 26, where the recording is made in terms of the specific gravity of the fluid. If desired, a nonrecording transducer may be used to indicate specific gravity.

The relationship of the weight of the fluid passing through the coils to its specific gravity will be understood by the fact that the volume of material in the coil is constant. Accordingly, the weight of the constant volume may be readily converted into specific gravity.

Periodically the pump is turned off for an interval which is predetermined, in order to determine the gel strength of the fluid. At this time the pressure in the air bell will gradually fall until the mud stops flowing due to initial gelation, at which time the pressure will be above atmospheric if the mud is thixotropic. This residual pressure can then be taken as an indication of the initial gel strength of the mud. When the pump is turned on again, the peak pressure developed before the normal flow rate is attained is a measure of the gelling tendency of the fluid or its final gel strength.

In the event that difficulties are experienced in starting the flow of the gelled fluid, means are provided which, when the pressure in the air bell exceeds a predetermined amount, will cause a valve 43 to open and allow the pump to introduce air into the system. By the introduction of air, the obstruction may be cleared without the development of excess pressure. This valve is also opened when the system is being rendered inoperative, so that the entire system may be blown clear, by the air which is pumped therethrough, and thus avoid the excessive pressure that might be developed, had the mud been allowed to remain and gel in the system.

Thus it may be seen that the system shown schematically in Figure 1 enables a thixotropic fluid to have its viscosity measured by measuring the pressure in the air bell and its specific gravity measured by weighing a tubular coil containing the fluid, and its final gel strength measured by noting the peak pressure developed after starting the continual flow of fluid through the system after the pump has been turned off for a predetermined interval of time.

Figure 2 is a side view of the complete invention, showing the placement of the various parts thereof. A base 50 is employed to support the various components of the invention. A shaped footing 52 supports the base in a manner so that the vibration of the apparatus will not adversely affect the remaining apparatus employed. Supported on the base 50 is the air-bell chamber 22 and the air pump 38 which is used for pumping air through the valve 34, which is not seen on this drawing. The counterbalance 30 balances the coil of tubing 28 when filled with the calibrating fluid. An intake tube 54 is employed to bring the mud from the well to the tubular pump 20. The pump 20 includes a fly wheel 56, which is driven by means of a belt 58 from the same power source as drives the air pump 38. The fly wheel 56 serves to drive pump-actuating members generally designated by the number 60, which are attached to the fly wheel. These pump-actuating members are explained in more detail in connection with Figure 3 of the drawings. The pump-actuating members serve to compress and release compression upon a tube 62. The pump-actuating members are actually urged downward by compression springs 64, 66. The intake tube 54 is connected to the tubular member 62, and the output of the tubular member is connected to the air bell 22. The recorder is connected by means of a pipe 65 to the top of the air bell 22.

Reference is now made to Figure 3 of the drawings, which shows in enlarged section the pump apparatus of this invention. The air pump 38 is conventional and merely consists of a cylinder 70, containing a piston (not shown), which is driven from a bell crank lever 72. The air is lead through the tube 36 to the valve 34, shown in dotted lines. The pipeline 42 leads from the valve 34 to the pressure recorder.

In the description that follows, Figure 4 should be considered together with Figure 3, since Figure 4 shows the details of the tubular pump employed in the embodiment of the invention in an enlarged fashion. The elastic tubular member 62 is compressed by what may be called two valve-point members 80, 82, and a valve-flat member 84. The tubular member is shown in isometric view in Figure 5, and consists of the tube 62, which, as may be seen in section in Figure 6, has two slots at the sides 63, 65. As may be better seen in Figure 7, these slots 63, 65 enable a valve member 84 to compress the tube more readily and, also, to compress it until the central opening is completely closed. These slots actually extend the life of the tubular member, but it is also possible to use an elastic tube with circular exterior.

The valve-point members 80, 82 actually consist of rods, which are supported on either side of what may be called a shoe member 86 and are together operated in a manner similar to the heel-and-toe action of a shoe. The shoe member is connected to a bell crank lever 88, which is driven from the fly wheel 56. For pumping in one direction, the shoe member is so driven as to first move the valve-point member 80 to compress the tube 62. This is followed by the valve point 82 being brought down to compress the tube. Next the valve-point member 80 is lifted, leaving valve point 82 compressing the tube. Next valve point 80 is brought down to compress the tube, and then, while this is left compressing the tube, the valve point 82 is lifted from its compressing position. Thus, the heel-and-toe analogy of the motion of these two valve-point members should be appreciated. The motion of the valve-flat member in co-operation with these two members is described below.

The flat-valve member 84 is moved in a vertical direction by means of two lever members, respectively designated as a short lever member 91 and a long lever member 93. A post 92 serves as the support and levering position for the two lever members. The long lever member is driven from a bell crank arm 99 to which it is pivotally attached. Thus, in rotation of the wheel 56, the bell crank arm 99 serves to operate the lever arms in a manner so that the long valve member 84 is lifted from a compressing position upward and then back again. In operation, it comes down after point-valve member 80 has closed tube 62 and lifts up again after point-valve member 82 has closed tube 62.

It was previously pointed out that the valve-point members 80 and 82 are actually rods which are supported in the heel and toe of a shoe member 86. The rod member 80 extends on either side of shoe member 86 and is rotatably attached to the same structural support as compression-rod members 89 and 89A. Compression-rod members 90 and 90A are attached in the same manner to auxiliary rod member 95. There are actually four of these compression-rod members, but only two of these, 89 and 90, can be seen in Figure 3. The lower ends of these rod members are threaded for nuts that carry a bridge 94 between the members 89 and 89A. Another 94A of the same type is between the members 90 and 90A. The bridges 94 and 94A carry one compression spring each. The upper end of the compression springs is resting against the lower side of trough-like member 100. The nuts on the lower end of the rod members 89, 90, 89A, and 90A provide the adjustment for the right amount of tension of the valve-point members 80 and 82 to close tube 62.

Figure 8 shows the details of the shoe member and the associated equipment for moving the valve members. The pivotal attachment of the bell crank arm 88 to the shoe member 86 is designated as 87. The rods forming valve-point members 80, 82 may be seen. Auxiliary rod member 95 is shown which is just above the valve member 82. This auxiliary rod member has the compression member rods 90, 90A pivotally attached thereto. Rod 85 is the central cross member between the stabilizer plates 85A and 85B which are pivotally attached to trough-like member 100 at point 97 and 97A. This unit serves to stabilize the rocking motion of shoe member 86, as well as to keep it from leaving its position in trough-like member 100 (keep it from walking). As previously described, these members, in conjunction with the compression springs, serve to urge the shoe member downward at the proper portion of its cycle. The tubular member 62 is in a trough formed by the support member 100. This trough may be filled with oil to prolong the life of the tubular member 62. The tubular member is kept in position in the trough by means of blocking members 102, 104.

Reference is now made to Figures 9, 10, and 11, in order to show the succession of operations of the valve members. If a starting position is assumed, as in Figure 9, with the valve-point member 80 compressing the tube, then the valve-flat member 84 is in the process of being brought into the compressing position and the valve-point member 82 is removed from the compressing position. Next, as shown in Figure 10, the valve-flat member 84 is brought down to the compressing position, the valve-point member 82 is brought down to the compressing position, while the valve-point member 80 remains in the compressing position. In Figure 11, it may be seen that the valve-point member 80 is elevated from the compressing position, the valve-flat member 84 is on its way up from its compressing position, and the valve-point member 82 remains in the compressing position. Thus, with the pump in the position shown in Figure 11, the vacuum created by the operation to that position enables material to be forced by the atmosphere into the tube. The position which follows the one shown in Figure 11 is the one shown in Figure 9, whereby the material which enters is prevented from flowing backwards by the closure of the valve 80.

There is an intermediate position between that shown in Figures 9 and 10, as well as a second intermediate position between that shown in Figures 10 and 11. The intermediate position between Figures 9 and 10 is one wherein the valve member 84 comes down and compresses a tube before the valve member 82 does, whereby the contents of the tube which has been admitted are completely squeezed out and the job is really completed when the position shown in Figure 10 has been attained. Members 80 and 82 move rather rapidly at the time when 84 has reached its highest or lowest position, respectively. Reversing of rotation of flywheel 56 also reverses direction of pumping action with no loss in efficiency.

The tubular pump shown achieves its operation by the unique arrangement of the lever members and the peculiar configuration of the shoe member. It provides a constant flow rate that is substantially independent of head pressure within the working pressure range of the pump, and will operate satisfactorily with corrosive or abrasive slurries. The nozzle 96, which enters to the left, or entrance portion, of the pump, is the nozzle from the valve 43, shown in Figure 1, which opens to admit air into the pump when the pressure measured in the bell jar exceeds that of a predetermined level which is indicative of the fact that there is an obstruction to the flow of fluid.

Figure 12 is a cross-sectional view of the air-bell chamber 22. As shown therein, the pump enters the fluid not near the base, but substantially toward the center of the air-bell chamber. The bottom of the air-bell chamber is substantially V-shaped and has an opening 23, to which is coupled the tubing which connects the air-bell chamber with the specific gravity apparatus.

Reference is now made to Figures 13 and 14, which are respectively side and plan views of the apparatus for measuring the specific gravity of the fluids. The tubular coil 28, by means of tubes 106, 107, is brought to a rotating coupling 110A. By means of this rotating coupling, the tubular member can be pivoted about the coupling and still receive and emit a constant flow of the fluid undergoing the test. A support beam 110 pivotally holds the tubular member in position so that it can be levered or pivoted about the pivotal coupling. To the other end of the balance beam 110 is attached a weight 30, which may be positioned at desired points to balance the tubing by means of the threaded rod 114, upon which the weight is threaded. The plate 32 is held supported between the two arms of the supporting beam 110. It will be recalled from the discussion of Figure 1, this plate 32 serves the function of pressing down upon the top of the valve member 34. The spring-loaded pin 35, which extends from the valve member, is held against the plate by means of the air pressure which is provided from the pump 38. The bolt 116 and the adjustable nut 118, which are attached to the support member, serve to provide an extreme position to which the weight can pivot the support member on its side of the fulcrum. The valve 34 also serves as a stop member to limit the position to which the tube can be lowered on its side of the fulcrum.

Figure 15 shows the electrical circuitry which is entailed in the embodiment of the invention. Power for operation is taken from the power mains by means of a starting switch 120. The applied voltage starts the timing motor 139 and activates the step-down transformer 122, and, if the recorder 124 has its pen 126 at the zero position, the power is applied therethrough to a time-delay solenoid switch 128. This operates to lift its contact 128A off the terminal 128B, whereby solenoid 130 has its connection therethrough opened. When mud begins to flow, then flow-line switch 132 is operated to the start position. This energizes solenoid 134, which causes the latches 134A, 134B to be withdrawn and permits contacts 130A and 130B to connect with their contact immediately below them. These contacts 130A, 130B close connections to energize a motor 136, which powers the air pump and mud pump 56. Pressure then being built up in the air-bell chamber causes the recorder pen 126 to be lifted from its zero position. This breaks the connection with solenoid switch 128, which is then de-energized. When this happens, contact 128A makes connections with contact 128B, which is the normal position while the pump is operating.

If mud ceases to flow in the flow line, then flow-line switch 132 tilts toward a stop position. This causes solenoid valve 138 to become energized. As a result, air is permitted to enter the pump 56, which serves to push the remainder of the liquid from the entire system and thus purges the system with air. The pressure in the air bell, as a result of expulsion of the mud, will soon drop to zero, driving the contact 126 to the zero position. As a result, solenoid 130 is momentarily energized through contacts 128A and 128B which are closed. This causes the contacts 130A and 130B to be drawn upwards and locked in this position, thus breaking the contact to the succeeding apparatus, and thereby de-energizing motor 136 and solenoid valve 138. Time-delay relay 128 is then shortly thereafter energized, opening contacts 128A and 128B and de-energizing solenoid relay 130.

If for any reason during the operation of the apparatus the pressure increases beyond the upper range of the recorder, which may be set as desired, the contact 126 will close with the upper setting which is designated as 30 on the meter face shown in the drawing, whereby solenoid 140 is energized. This serves the purpose of pulling up contact 140A and closes the circuit to solenoid valve 138, whereby air is permitted to enter into the pump 56 and therefrom into the system to drive out whatever is obstructing the system and thus reduce the pressure therein. As soon as the pressure has returned to normal, the contact to solenoid 140 is broken, whereby it is rendered inoperative and, in turn, it renders the solenoid 138 inoperative. The pump is then enabled to continue pumping mud into the system. The timing motor 139 serves the function of closing off the pump periodically for a predetermined period of time. From test runs, this has been set as a closing down of a period from five to ten minutes every hour, in order to permit the mud to gel.

Reference is now made to Figure 16, which shows a portion of a chart which is made during the testing of the mud. The solid line on the chart represents the viscosity-determination of the mud as it is continually being run through the system. The chart is taken over an interval of three hours, with eight-minute gel intervals. As shown, the viscosity first drops off rapidly at the beginning of the gel period when the pump stops, and then at the end of the gel period, when the pump starts, it rises abruptly and reaches a maximum, which it holds for a few moments until normal movement of the mud begins to break down the gel and cause a lowering of the relative viscosity. The weight, which is a measure of the specific gravity of the fluid, is shown in a dotted line. From this chart the characteristics of the mud may be readily observed.

There has accordingly been shown and described herein a novel, useful, and reliable system for testing the characteristics of thixotropic fluids. The system is accurate in operation, and enables the monitoring of the fluid over long periods of time with a minimum of attention.

We claim:

1. In apparatus of the type described, a novel pump for circulating fluids comprising a tube of resilient material, a support member backing said tube for compressive operation, a valve-flat member, a first and second valve-point member spaced along said tube and on either side of said valve-flat member, means to first move said first valve-point member from a first position compressing said tube away from said tube and then back while said second valve-point member remains in a first position compressing said tube and to next move said second valve-point member from its first position away from said tube and then back while said first valve-point member remains in said compressing position, said last-named means including a shoe member having a heel and toe portion and having said first and second valve-point members respectively mounted in said heel and toe portions, a bell-crank lever, and means pivotally coupling an end of said shoe member opposite said heel portion to said bell-crank lever, and means to move said valve-flat member away from a first position compressing said tube after said first valve-point member has been moved from its first position and back to its first position just before said second valve-point member has been returned to its first position.

2. Apparatus as recited in claim 1 wherein said means to move said valve-flat member includes a short lever member, a long lever member, a rod extending at right angles from said valve-flat member, a support member positioned spaced from and parallel to said rod, means to pivotally support said short and long lever members spaced from one another and at one of their ends from said support member, means to pivotally attach said rod member to the other end of said short lever member and to said long lever member at a position therealong equal to the distance of the attachment to said short lever member, and a bell-crank lever attached to the other end of said long lever member.

3. A pump comprising a tube of resilient material, a support member backing said tube for compressive operation, a pair of grooves extending on either side of said tube, a first bar, a second bar, a support member for said first and second bars including two parallel shoe-shaped members positioned on either side of said tube each having a heel and toe portion, said first bar being supported over said tube in said toe portion, said second bar being supported over said tube in said heel portion, a first bell-crank lever pivotally attached to an end of said shoe-shaped members opposite said heel portion, a flat member positioned over said tube and extending between said first and second bars, a rod extending at right angles from said flat member, a short lever member, a long lever member, a support member positioned spaced from and parallel to said rod, means to pivotally support said short and long lever members spaced from one another and at one of their ends from said support member, means to pivotally attach said rod member to the other end of said short lever member and to said long lever member at a point substantially equal to the distance of the attachment to said short lever member, a second bell-crank lever attached to the other end of said long lever member, and means to drive said first and second bell-crank levers together from their other ends.

4. A pump as recited in claim 3 wherein there is included spring means to yieldably bias said support member backing said tube for compressive action by said first and second bars and said flat member.

References Cited in the file of this patent

UNITED STATES PATENTS

| 2,351,828 | Marsh | June 20, 1944 |
| 2,393,838 | Tarbox | Jan. 29, 1946 |
| 2,412,397 | Harper | Dec. 10, 1946 |
| 2,693,766 | Seyler | Nov. 9, 1954 |
| 2,695,567 | Harvey | Nov. 30, 1954 |